United States Patent
You

(10) Patent No.: US 12,256,042 B2
(45) Date of Patent: Mar. 18, 2025

(54) CALL DISPATCH METHOD AND CALL DISPATCH CONTROL SERVER

(71) Applicants: HYUNDAI MOTOR COMPANY, Seoul (KR); Kia Corporation, Seoul (KR)

(72) Inventor: Kyungjin You, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 387 days.

(21) Appl. No.: 17/544,477

(22) Filed: Dec. 7, 2021

(65) Prior Publication Data

US 2023/0056970 A1 Feb. 23, 2023

(30) Foreign Application Priority Data

Aug. 19, 2021 (KR) ........................ 10-2021-0109494

(51) Int. Cl.
| | |
|---|---|
| H04M 3/436 | (2006.01) |
| G06Q 50/40 | (2024.01) |
| G08G 1/00 | (2006.01) |
| H04M 3/42 | (2006.01) |

(52) U.S. Cl.
CPC ............ *H04M 3/436* (2013.01); *G06Q 50/40* (2024.01); *G08G 1/202* (2013.01); *H04M 3/42348* (2013.01)

(58) Field of Classification Search
CPC .. H04M 3/436; H04M 3/42348; G06Q 50/40; G08G 1/202
USPC ...................................... 455/414.1
See application file for complete search history.

(56) References Cited

U.S. PATENT DOCUMENTS

2022/0005086 A1* 1/2022 Ittiachen ............ G06Q 30/0207

\* cited by examiner

*Primary Examiner* — Joel Ajayi
(74) *Attorney, Agent, or Firm* — MORGAN, LEWIS & BOCKIUS LLP

(57) ABSTRACT

A call dispatch method and server is provided, in which when call request information is transmitted from a user terminal to a control server, the control server may transmit the call information to one or more driver terminals in consideration of a call score and the like, and a driver may select a call keep function through a driver terminal, thereby withholding determination of whether to accept or reject a call for a predetermined time.

14 Claims, 9 Drawing Sheets

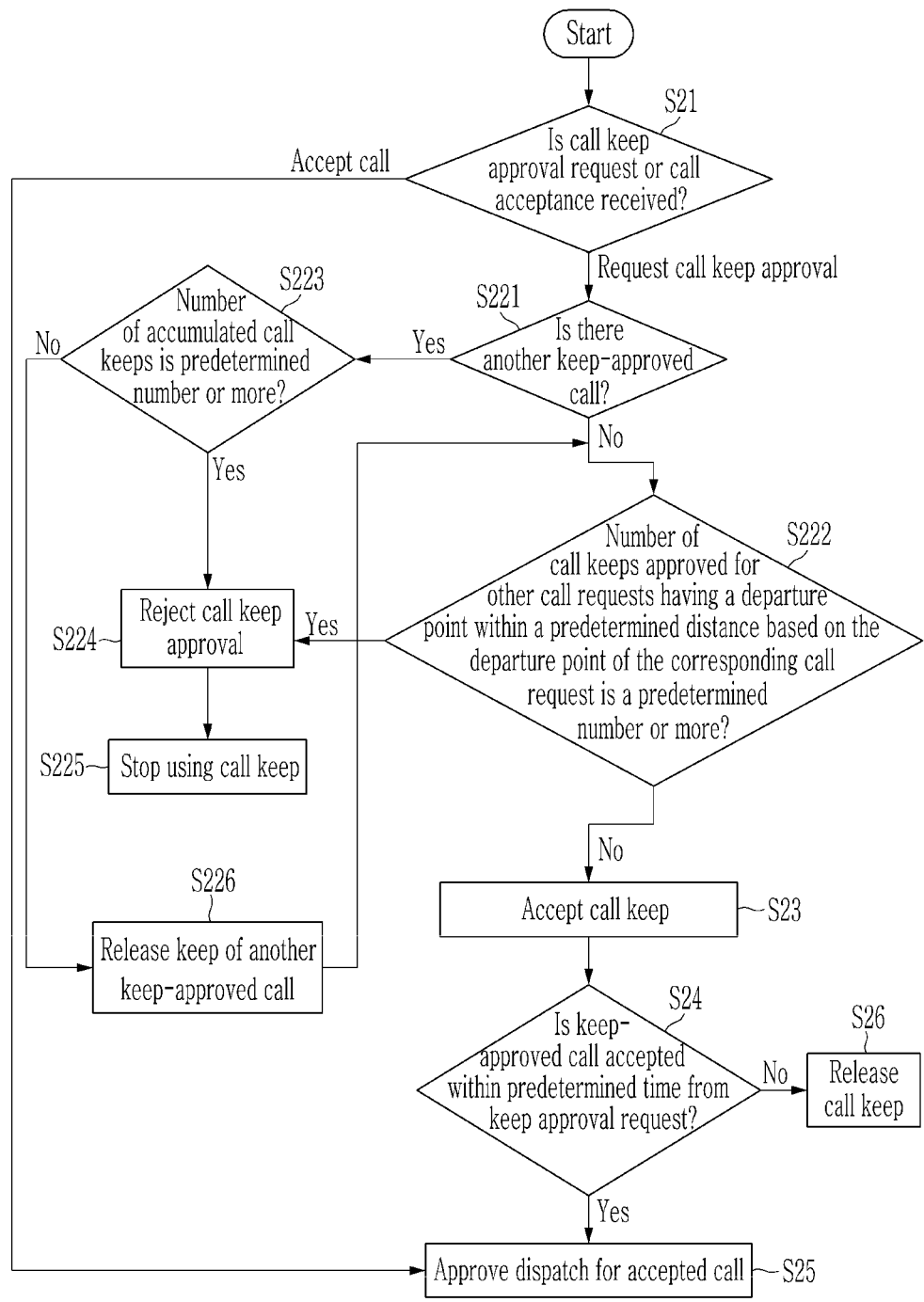

CALL DISPATCH METHOD AND CALL DISPATCH CONTROL SERVER

CROSS-REFERENCE TO RELATED APPLICATION

This application claims priority to and the benefit of Korean Patent Application No. 10-2021-0109494 filed in the Korean Intellectual Property Office on Aug. 19, 2021, the entire contents of which are incorporated herein by reference.

TECHNICAL FIELD

The present invention relates to a call dispatch method and a call dispatch control server.

BACKGROUND

Recently, with the development of IT technology, a taxi call dispatch method through mobile terminals of a taxi driver and a taxi user is provided by various service providers.

In a call dispatch method through a mobile terminal, when a taxi user requests a call, a taxi driver may accept or reject the call. However, there is a need for the taxi driver to select an option other than accepting or rejecting the call.

In addition, in order to additionally receive another call at a destination of the taxi call, it is necessary to provide the taxi driver with information on the destination of the call.

The above information disclosed in this Background section is only for enhancement of understanding of the background of the disclosure, and therefore it may contain information that does not form the prior art that is already known in this country to a person of ordinary skill in the art, and should not be taken as an acknowledgment that this information forms any part of prior art.

SUMMARY

The present disclosure has been made in an effort to provide a call dispatch method and a call dispatch control server that may provide various choices to a driver by allowing the driver who receives call information through a driver terminal to withhold a decision on whether to accept or reject the call for a predetermined period of time.

In addition, the present disclosure has been made in an effort to provide a call dispatch method and a call dispatch control server that may provide a variety of information to a driver, by giving a call score when transmitting call information to a driver terminal; by allowing the driver to operate a vehicle according to the call information when the driver accepts the call and dispatches the vehicle; and by allowing the driver to determine whether new call information may be received in advance after arriving at a destination.

The objects of the present disclosure are not limited to the objects mentioned above, and other objects not mentioned can be clearly understood by those skilled in the art from the description below.

An embodiment of the present disclosure provides a call dispatch method, including: receiving, by a control server, a call request signal from a user terminal; calculating, by the control server, a call score for the call based on the number of call requests in which a location within an arrival range of the call is set to a departure point; transmitting, by the control server, call information according to the call request signal to a plurality of driver terminals when the call score is a predetermined score or more; receiving, by the control server, a call keep approval request for the call from one of the plurality of driver terminals; determining, by the control server, whether to approve the call keep based on whether call keep situation information for the one driver terminal satisfies an approval requirement; and releasing, by the control server, when not receiving call acceptance of the call within a predetermined time from the one driver terminal, an approved call keep.

The calculating of the call score may include calculating, by the control server, the call score by adding at least two of the number of call requests in which a location that is within an arrival range of the call based on a specific time point depending on a time point at which the call request signal is received is set to a departure point, a daily average value of the call requests in which the location that is within the arrival range of the call is set to the departure point, and an average value of a day of a week of the call requests in which the location that is within the arrival range of the call is set to the departure point.

The determining of whether to approve the call keep may include determining, by the control server, when there is another keep-approved call for the one driver terminal and when the accumulated number of cases in which call keep is approved and then released for the one driver terminal is a predetermined number or more, that the call keep situation information does not satisfy the approval requirement.

The determining of whether to approve the call keep may include: releasing, by the control server, when there is another keep-approved call for the one driver terminal and when the accumulated number of cases in which call keep is approved and then released for the one driver terminal is less than a predetermined number, the keep of another call for which the keep has been approved; and determining, by the control server, when the number of call keeps approved for another call request having a departure point within a predetermined distance based on a departure point of the call is a predetermined number or more, that the call keep situation information does not satisfy the approval requirement.

The determining of whether to approve the call keep may include: releasing, by the control server, when there is another keep-approved call for the one driver terminal of the plurality of driver terminals and when the accumulated number of cases in which call keep is approved and then released for the one driver terminal is less than a predetermined number, the keep of another call for which the keep has been approved; and determining, by the control server, when the number of call keeps approved for another call request having a departure point within a predetermined distance based on a departure point of the call is less than a predetermined number, that the call keep situation information satisfies the approval requirement.

The determining of whether to approve the call keep may include determining, by the control server, when there is no other keep-approved call for the one driver terminal of the plurality of driver terminals and when the number of call keeps approved for another call request having a departure point within a predetermined distance based on a departure point of the call is a predetermined number or more, that the call keep situation information does not satisfy the approval requirement.

The determining of whether to approve the call keep may include determining, by the control server, when there is no other keep-approved call for the one driver terminal of the plurality of driver terminals and when the number of call keeps approved for another call request having a departure point within a predetermined distance based on a departure point of the call is less than a predetermined number, that the call keep situation information satisfies the approval requirement.

The call dispatch method may further include: rejecting, by the control server, approval of the call keep when the call keep situation information does not satisfy the approval requirement; and not approving, by the control server, when rejecting the approval of the call keep, the call keep approval request received from the one driver terminal for a predetermined time.

Another embodiment of the present disclosure provides a control server including: a call transmitter, when a call request signal including a departure point, a destination, and a call request time is received from a user terminal for dispatch of a vehicle, that transmits call information according to the call request signal to a plurality of driver terminals; a keep approval determiner, when a call keep approval request is received from one of the plurality of driver terminals, that determines whether to approve the call keep or reject the call keep approval based on whether call keep situation information satisfies an approval requirement; and a call dispatch approval part, when a call acceptance for the kept call is received within a predetermined time after the call keep approval is determined, that approves dispatch for the accepted call.

The call transmitter may calculate a call score by adding at least two of the number of call requests in which a location that is within an arrival range of the call based on a specific time point depending on a time point at which the call request signal is received is set to a departure point, a daily average value of the call requests in which the location is set to the departure point, and an average value of a day of a week of the call requests in which the location is set to the departure point, and transmits, when the call score is a predetermined score or more, call information according to the call request signal to the driver terminal.

The approval requirement may be determined based on whether there is another keep-approved call for the one driver terminal, the accumulated number of cases in which call keep is approved and then released for the one driver terminal, and the number of call keeps approved for another call request in which a location within a predetermined distance based on a departure point of the call request is a departure point.

The keep approval determiner may reject the call keep approval when there is another keep-approved call for the one driver terminal and when the accumulated number of cases in which call keep is approved and then released for the one driver terminal is a predetermined number or more.

The keep approval determiner may release the keep of another call for which the keep has been approved when there is another keep-approved call for the one driver terminal and when the accumulated number of cases in which call keep is approved and then released for the one driver terminal is less than a predetermined number.

The keep approval determiner may reject the call keep approval when the number of call keeps approved for another call request having a departure point within a predetermined distance based on a departure point of a call for which the keep approval is requested is a predetermined number or more.

The keep approval determiner may approve the call keep for which the approval is requested when the number of call keeps approved for another call request having a departure point within a predetermined distance based on a departure point of a call for which the keep approval is requested is less than a predetermined number.

The keep approval determiner may reject the call keep approval when there is no other keep-approved call for the one driver terminal and when the number of call keeps approved for another call request having a departure point within a predetermined distance based on a departure point of a call for which the keep approval is requested is a predetermined number or more.

The keep approval determiner may approve the call keep for which the approval is requested when there is no other keep-approved call for the one driver terminal and when the number of call keeps approved for another call request having a departure point within a predetermined distance based on a departure point of the call is less than a predetermined number.

According to the embodiments of the present disclosure, it is possible to provide various choices to a driver by allowing the driver who receives call information through a driver terminal to withhold a decision on whether to accept or reject the call for a predetermined period of time.

In addition, it is possible to provide a variety of information to a driver, by giving a call score when transmitting call information to a driver terminal; by allowing the driver to operate a vehicle according to the call information when the driver accepts the call and dispatches the vehicle; and by allowing the driver to determine whether new call information may be received in advance after arriving at a destination.

The objects of the present disclosure are not limited to the objects mentioned above, but other objects not mentioned can be clearly understood by those skilled in the art from the description below.

BRIEF DESCRIPTION OF THE DRAWINGS

FIG. 6 illustrates a detailed flowchart of a call dispatch method according to an embodiment in which a step of determining whether call keep situation information of FIG. 4 satisfies an authorization requirement is implemented.

DETAILED DESCRIPTION

Figure 1:
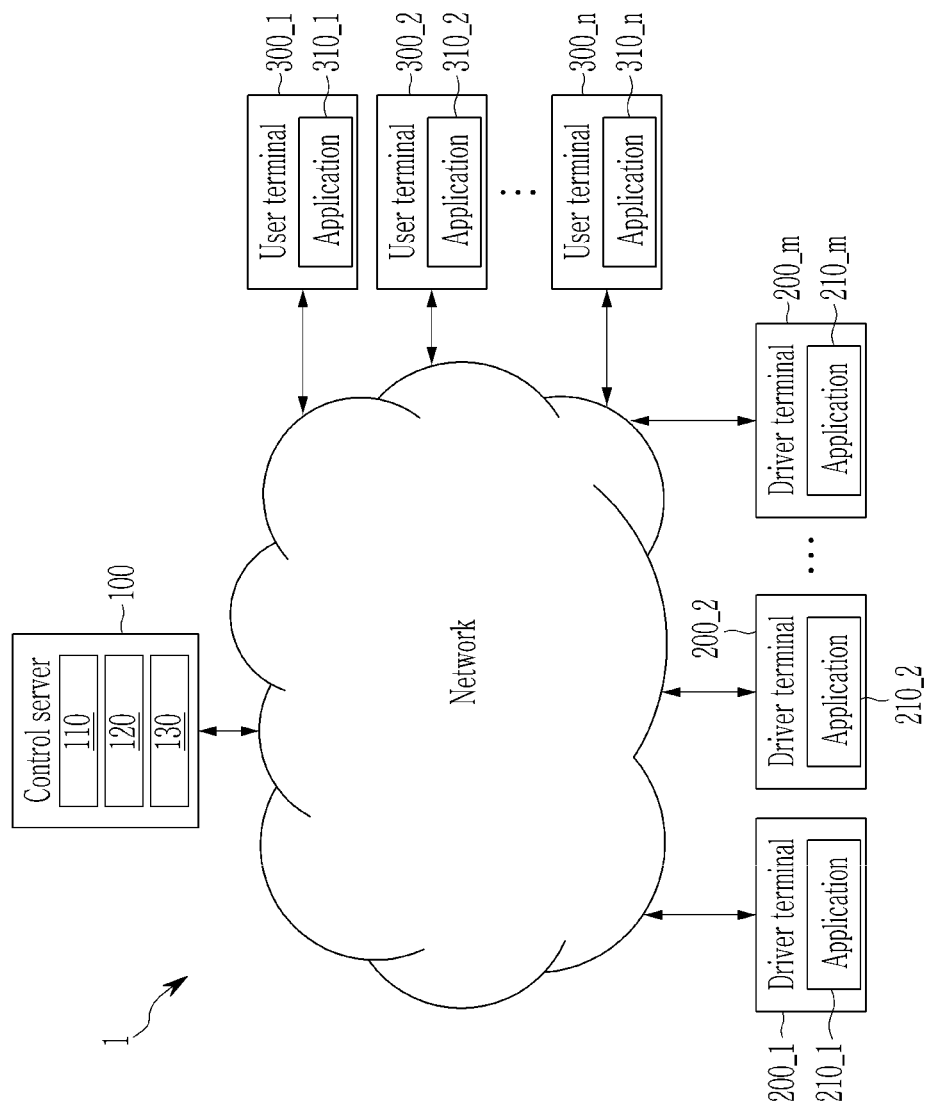
FIG. 1 illustrates a block diagram of a call dispatch system according to an embodiment.

The present disclosure relates to a call dispatch system and method in which when call request information is transmitted from a user terminal to a control server, the control server may transmit the call information to one or more driver terminals in consideration of a call score and the like, and a driver may select a call keep function through a driver terminal, thereby withholding determination of whether to accept or reject a call for a predetermined period of time. Here, the control server may be a server that manages a taxi mobility platform or a fleet system server. The taxi mobility platform may be a platform using a taxi terminal that uses a plurality of applications in which various functions necessary for taxi operation are implemented and that uses a data storage that transmits data written by each of the plurality of applications to a related application. The fleet system server may mean a server for managing a fleet. In the attached drawings, like numerals are used to represent like elements. In the drawings, the dimensions of the elements are enlarged for easier understanding of the present disclosure. Although the terms first, second, etc. may be used to describe various elements, these elements should not be limited by the terms. The terms are used only to distinguish one element from another. For example, a first element can be termed a second element and, similarly, a second element can be termed a first element without departing from the scope of the present disclosure. A singular expression includes a plural expression unless the context clearly indicates otherwise.

In the present disclosure, terms such as "include", "contain", "have", etc. should be understood as designating that features, numbers, steps, operations, elements, parts or combinations thereof exist and not as precluding the existence of or the possibility of adding one or more other features, numbers, steps, operations, elements, parts or combinations thereof in advance. In addition, when an element such as a layer, a film, a region, a substrate, etc. is referred to as being "on" another element, it can be "directly on" another element or an intervening element may also be present. Likewise, when an element such as a layer, a film, a region, a substrate, etc. is referred to as being "under" another element, it can be "directly under" another element or an intervening element may also be present.

Unless specified otherwise, all the numbers, values and/or expressions representing the amount of components, reaction conditions, polymer compositions or mixtures are approximations reflecting various uncertainties of measurement occurring in obtaining those values and should be understood to be modified by "about". Also, unless specified otherwise, all the numerical ranges disclosed in the present disclosure are continuous and include all the values from the minimum values to the maximum values included in the ranges. In addition, when the ranges indicate integers, all the integers from the minimum values to the maximum values included in the ranges are included unless specified otherwise.

Hereinafter, embodiments disclosed in the present specification will be described in detail with reference to the accompanying drawings, and in the present specification, the same or similar constituent elements will be denoted by the same or similar reference numerals, and a redundant description thereof will be omitted. The terms "module" and/or "unit, portion, or part" representing constituent element used in the following description are used only in order to make understanding of the specification easier, and thus, these terms do not have meanings or roles that distinguish them from each other by themselves. In addition, in describing embodiments of the present specification, when it is determined that a detailed description of the well-known art associated with the present disclosure may obscure the gist of the present disclosure, it will be omitted. Further, the accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

In the present application, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance.

A program implemented as a set of instructions embodying a control algorithm necessary for controlling another component may be installed in a component for controlling another component under a specific control condition among components according to an embodiment. A control component may generate output data by processing input data and stored data according to the installed program. The control component may include a non-volatile memory for storing a program and a memory for storing data.

FIG. 1 illustrates a block diagram of a call dispatch system according to an embodiment.

Referring to FIG. 1, a call dispatch system 1 includes a control server 100, a plurality of driver terminals 200_1 to 200_n, and a plurality of user terminals 300_1 to 300_n. Respective components are connected to each other through a network.

Hereinafter, when a common operation and technical characteristics of the plurality of driver terminals 200_1 to 200_m are described, they are referred to as a driver terminal 200. When a common operation and technical characteristics of a plurality of applications 210_1 to 210_m are described, they are referred to as an application 210. The application 210 is installed in each driver terminal 200. Hereinafter, a specific driver terminal among the plurality of driver terminals 200_1 to 200_m is denoted as a driver terminal 200_i to describe the call dispatch system. Hereinafter, terminals excluding the driver terminal 200_i among the plurality of driver terminals 200_1 to 200_m are denoted as remaining driver terminals.

Hereinafter, when features of operations through the application 210 are described, the driver terminal 200, the driver terminal 200_i, or the remaining driver terminals are described as being operated.

Hereinafter, a call specified by call information transmitted from the control server 100 to the driver terminal 200_i to use a call dispatch service is indicated as a corresponding call. In addition, calls excluding the corresponding call among the calls transmitted from the control server 100 are denoted as other calls.

When a common operation and technical characteristics of the plurality of user terminals 300_1 to 300_n are described, they are referred to as a user terminal 300. When a common operation and technical characteristics of a plurality of applications 310_1 to 310_m are described, they are referred to as an application 310. The application 310 is installed in each user terminal 300.

The control server 100 determines whether to accept or keep a call request by using data received from the user terminal 300 and the driver terminal 200. The call request is that one of the user terminals 300 offers to use a taxi and one of the driver terminals 200 requests an approval. A call keep (hereinafter referred to as a keep) refers to withholding whether to accept or reject a call request for a predetermined period of time. The driver may decide whether to accept or reject the corresponding call within a predetermined period of time from a time point when the call information is received through the keep.

The control server 100 may include a call transmitter 110, a keep approval determiner 120, and a call dispatch approval part 130.

The call transmitter 110, when a call request signal including a departure point, a destination, and a call request time from the user terminal 300 for dispatch of a vehicle is received, may transmit call information according to the call request signal to the plurality of driver terminals 200_1 to 200_m.

The call transmitter 110 may calculate a call score, and when the call score is equal to or larger than a predetermined score, it may transmit call information according to the call request signal to the driver terminals 200_1 to 200_m. The call score may be derived by adding at least two of the number of call requests in which a location within an arrival range of the call based on a specific time point depending on a time point at which the call request signal is received is set to a departure point, a daily average value of the call requests in which the location within the arrival range of the call is set to the departure point, and an average value of a day of a week of the call requests in which the location within the arrival range of the call is set to the departure point.

The keep approval determiner 120, when a call keep approval request is received from one of the plurality of driver terminals 200_1 to 200_m, may determine whether to approve or reject the call keep based on whether call keep situation information satisfies an approval requirement.

Here, the approval requirements are determined based on whether there is another keep-approved call to the driver terminal 200_i, the accumulated number of times that call keep is approved and then released for the driver terminal 200_i, and the number of call keeps approved for another call request in which a location within a predetermined distance based on the departure point of the call request is set to a departure point. Hereinafter, an embodiment in which the keep approval determiner 120 determines whether to approve or reject a call keep in consideration of an approval requirement will be described.

When there is another keep approval call to the driver terminal 200_i, and when the accumulated number of call keeps approved and then released for the driver terminal 200_i is a predetermined number or more, the keep approval determiner 120 may reject the keep approval.

When there is another keep approval call to the driver terminal 200_i, and when the accumulated number of call keeps approved and then released for the driver terminal 200_i is less than a predetermined number, the keep approval determiner 120 may release the keep of another call for which the keep has been approved.

After releasing the keep of another call, when the number of call keeps approved for another call request in which a location within a predetermined distance based on the departure point of the call for which the keep approval is requested is set to a departure point is a predetermined number or more, the keep approval determiner 120 may reject the call keep approval.

After releasing the keep of another call, when the number of call keeps approved for another call request in which a location within a predetermined distance based on the departure point of the call for which the keep approval is requested is set to a departure point is less than a predetermined number, the keep approval determiner 120 may approve the requested call keep.

When there is no other keep-approved call for the driver terminal 200_i and when the number of call keeps approved for another call request in which a location within a predetermined distance based on the departure point of the call for which the keep approval is requested is set to a departure point is a predetermined number or more, the keep approval determiner 120 may reject the call keep approval.

When there is no other keep-approved call to the driver terminal 200_i and the number of call keeps approved for another call request in which a location within a predetermined distance based on the departure point of the call is set to a departure point is less than a predetermined number, the keep approval determiner 120 may approve the requested call keep.

When call acceptance for the kept call is received within a predetermined time after the call keep approval is determined, the call dispatch approval part 130 may approve dispatch for the accepted call.

The call dispatch approval part 130 may approve dispatch for the accepted call upon receiving a call acceptance without a call keep request.

The driver terminal 200 is a terminal used by a taxi driver to use the call dispatch system and method of the present disclosure. The driver terminal 200 may be a terminal that may provide a function for transmitting and receiving information necessary to provide a call dispatch service with the control server 100 through a network and in which an application program for generating information for providing the call dispatch service may be executed by processing the received information terminal. For example, the driver terminal 200 may be implemented as one of a smart phone, a tablet PC, a slate PC, a laptop computer, and the like. In addition, the driver terminal 200 may be a terminal positioned inside a taxi. The driver terminal 200 according to an exemplary embodiment of the present disclosure may include a processor (e.g., computer, microprocessor, CPU, ASIC, circuitry, logic circuits, etc.). The processor may be implemented by a non-transitory memory storing, e.g., a program(s), software instructions reproducing algorithms, etc., which, when executed, transmits and receives information, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s). The driver terminal 200 has an associated non-transitory memory storing software instructions which, when executed by the processor of the driver terminal 200, provide a function for transmitting and receiving information necessary to provide a call dispatch service with the control server 100. The driver terminal 200 is not limited to those described above, and may be implemented as one of various terminals capable of providing a function necessary to provide a call dispatch service.

The user terminal 300 is a terminal used by a user who wants to use a taxi to use the call dispatch system and method of the present disclosure. The user terminal 300 may be a terminal that may provide a function for transmitting and receiving information necessary to use a call dispatch service and in which an application program for generating information for using the call dispatch service may be executed by processing the received information terminal. For example, it may be implemented as one of a smart phone, a desktop PC, a tablet PC, a slate PC, a laptop computer, and the like. The user terminal 300 according to an exemplary embodiment of the present disclosure may include a processor (e.g., computer, microprocessor, CPU, ASIC, circuitry, logic circuits, etc.). The processor may be implemented by a non-transitory memory storing, e.g., a program(s), software instructions reproducing algorithms, etc., which, when executed, transmits and receives information, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s). The driver terminal 200 has an associated non-transitory memory storing software instructions which, when executed by the processor of the driver terminal 200, provide a function for transmitting and receiving information necessary to use a call dispatch service and in which an application program for generating information for using the call dispatch service may be executed by processing the received information terminal. The user terminal 300 is not limited to those described above, and may be implemented as one of various terminals capable of using a function necessary to provide a call dispatch service.

Figure 2:
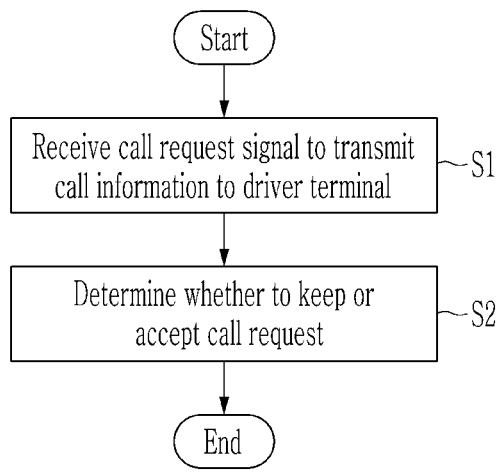
FIG. 2 illustrates a flowchart of a call dispatch method according to an embodiment.

FIG. 2 illustrates a flowchart of a call dispatch method according to an embodiment.

The control server 100 receives a call request signal from the user terminal 300, and transmits call information to the driver terminal 200 (S1). The call request signal may include a plurality of signals indicating a departure point, a destination, and a call request time. The call information may include a plurality of signals indicating a departure point, a destination, and a call request time included in a call request signal.

Then, the control server 100 determines whether to keep or accept the call request (S2). The driver terminal 200 receiving the call information may transmit one of a call keep approval request, a call acceptance, and a call rejection to the control server 100.

Figure 3:
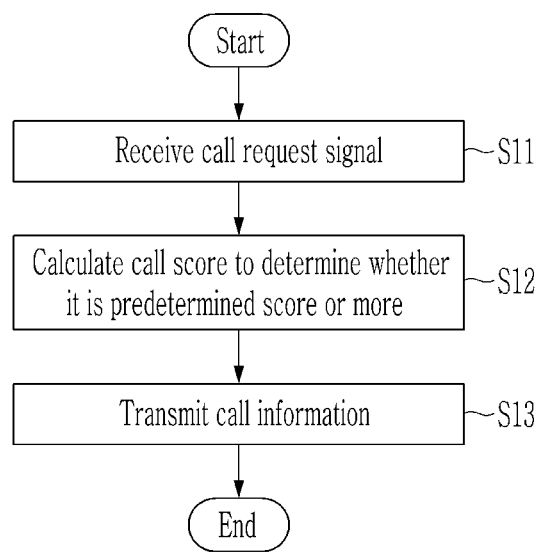
FIG. 3 illustrates a detailed flowchart for explaining a step of transmitting call information of FIG. 2.

FIG. 3 illustrates a detailed flowchart for explaining a step of transmitting call information of FIG. 2. FIG. 3 is a detailed flowchart for explaining step S1 of FIG. 2.

In step S1 of FIG. 2, when receiving a call request signal from the user terminal 300, the control server 100 may determine whether to transmit call information to the driver terminal 200 in consideration of a call score.

Referring to FIG. 3, the control server 100 receives a call request signal from the user terminal 300 (S11).

The control server 100 calculates a call score to determine whether it is a predetermined score or more (S12). The control server 100 calculates a call score from the received call request signal. The control server 100 calculates a call score based on the number of call requests of the call destination.

The control server 100 may calculate a call score by summing the number of destination calls, the number of daily average calls, and the number of average calls of a day of a week based on a specific point in time. Alternatively, the control server 100 may calculate a call score by adding up at least two of the number of destination calls, the number of daily average calls, and the number of average calls of a day of a week based on a specific point in time. The specific point in time may be a point in time between the point in time when the call request signal is received and the point in time when the call score is calculated.

The destination call number is the number of call requests in which a location within a predetermined distance (hereinafter, an arrival range) based on the destination of the call request at a specific point in time is set to a departure point.

The number of daily average calls per day is a daily average of the number of call requests for the arrival range. The number of average calls of a day of a week is an average value per day of a week of the number of call requests for the arrival range.

When the call score is larger than or equal to a predetermined score, the control server 100 transmits call information to the driver terminal 200 (S13). The predetermined score may be set through input information inputted through the driver terminal 200. Alternatively, the predetermined score may be preset as initial information. Alternatively, the predetermined score may be set as a minimum value, so that the control server 100 may transmit call information to the driver terminal 200 regardless of the call score.

The control server 100 may transmit call information to the driver terminal 200 positioned within a first predetermined distance based on the departure point of the call request based on the position of the driver terminal 200. When there is no driver terminal 200 positioned within the first predetermined distance, the control server 100 transmits call information to the driver terminal 200 positioned within a second predetermined distance based on the departure point of the call request. Alternatively, when the control server 100 fails to receive a call keep approval request or call acceptance from the driver terminal 200 that has received the call information, the control server 100 may transmit call information to the driver terminal 200 included within the second predetermined distance based on the departure point of the call request. Here, the second predetermined distance is longer than the first predetermined distance. The first predetermined distance and the second predetermined distance may be set through input information inputted through the driver terminal 200. Alternatively, the first predetermined distance and the second predetermined distance may be preset as initial information. For example, the first predetermined distance may be set to 2 km, and the second predetermined distance may be set to 3 km.

Hereinafter, a case in which the driver terminal 200_*i* that has received the corresponding call information transmits a call keep approval request or call acceptance to the control server 100 will be described.

Figure 4:
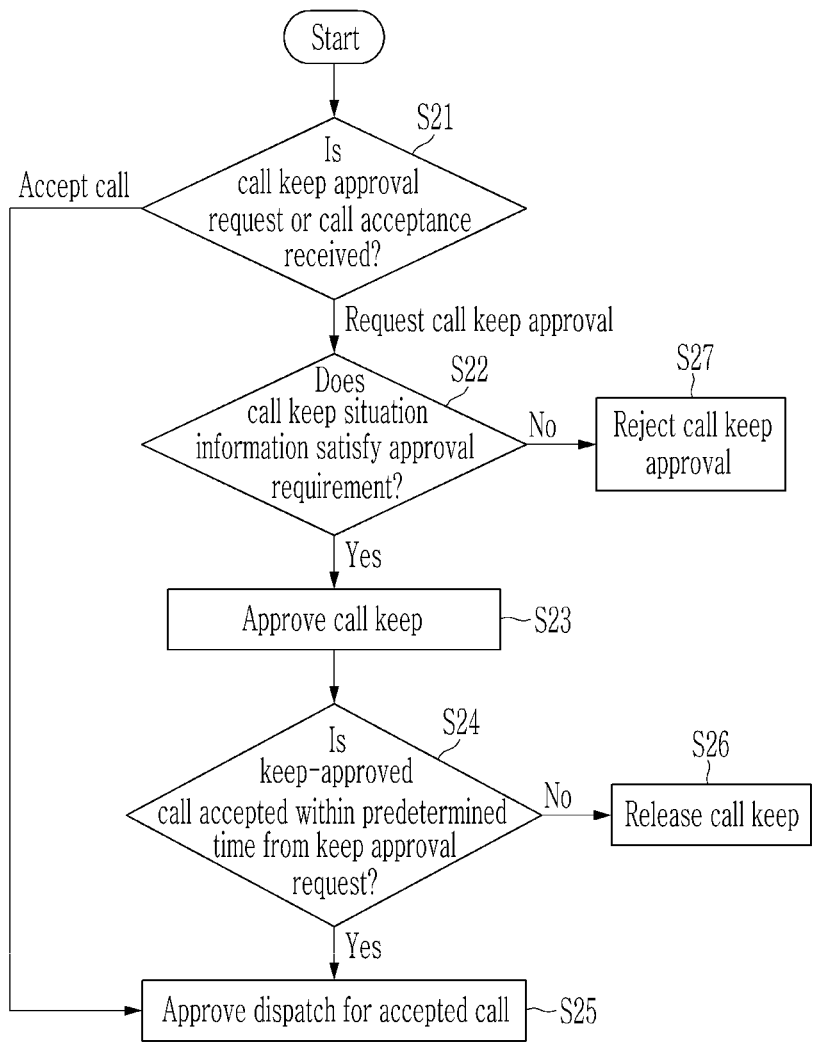
FIG. 4 illustrates a detailed flowchart for explaining a step of determining whether to keep or accept of FIG. 2, FIGS. 5A, 5B, and 5C illustrate a screen provided through an application in a driver terminal according to an embodiment.
Figure 5A:
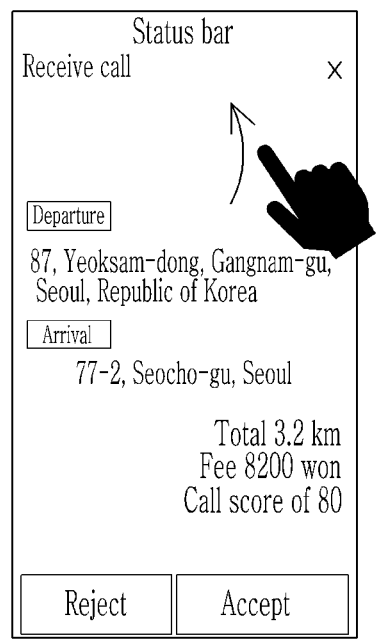
Figure 5B:
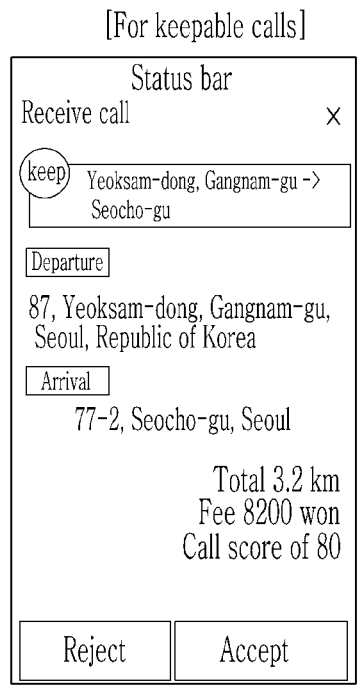
Figure 5C:
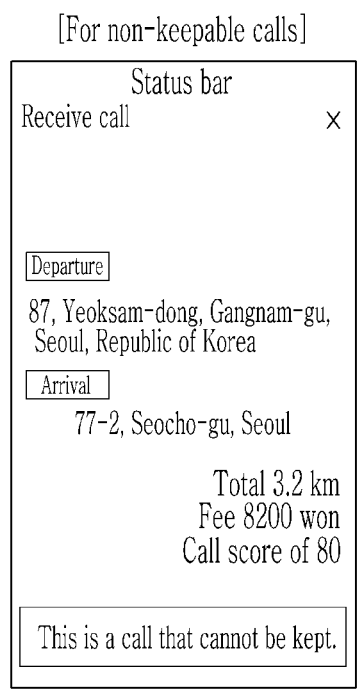

FIG. 4 illustrates a detailed flowchart for explaining a step of determining whether to keep or accept of FIG. 2. FIGS. 5A, 5B, and 5C illustrate a screen provided through an application in a driver terminal according to an embodiment. FIG. 4 is a detailed flowchart for explaining step S2 of FIG. 2.

In step S2 of FIG. 2, when the control server 100 receives a call keep approval request or call acceptance from the driver terminal 200_*i* that has received the corresponding call information, it may determine whether to approve the keep of the corresponding call, or may accept the corresponding call.

Referring to FIG. 4, the control server 100 determines whether a call keep approval request or call acceptance is received from the driver terminal 200_*i* that has received the corresponding call information (S21). The control server 100 transmits the corresponding call information to the driver terminal 200_*i*, and determines whether a call keep approval request or call acceptance is included in the signal received from the driver terminal 200_*i*.

The driver terminal 200_*i* may generate a call keep approval request based on a signal inputted through an input part of the driver terminal 200_*i* to transmit it to the control server 100. Alternatively, the driver terminal 200_*i* may be set to generate and transmit a call keep approval request to the control server 100 when a touch operation is inputted with respect to call information displayed on a touch screen of the driver terminal 200_i. The touch operation may include an input method using touch & flicking. The input method using touch & flicking is a method of operating so that a specific function may be performed by touching a finger or the like on a touch screen and sliding the touched finger in a certain direction.

Referring to FIG. 5A, when a flicking up operation is inputted through the touch screen of the driver terminal 200_i on which call information is displayed, the driver terminal 200_i may generate a call keep approval request to transmit it to the control server 100.

When the call keep approval request is received from the driver terminal 200_i, the control server 100 determines whether call keep situation information satisfies an approval requirement (S22).

The call keep situation information on call keep, such as whether there is another keep-approved call to the driver terminal 200_i, whether the accumulated number of times call keep is approved and then released for the driver terminal 200_i is a predetermined number of times or more, and whether the number of call keeps approved within a predetermined distance based on the departure point of the call request is a predetermined number or more.

The control server 100 approves the call keep when the call keep situation information satisfies the approval requirements (S23). When the control server 100 approves the call keep, the control server 100 may transmit keep approval information of the corresponding call to the driver terminal 200_i.

The driver terminal 200_i that has received the keep approval information may output the keep approval information through an output part. Referring to FIG. 5B, upon receiving the keep approval information from the control server 100, the driver terminal 200_i may display the keep approval information on the touch screen of the driver terminal 200_i.

After approving the keep of the corresponding call (S23), the control server 100 determines whether the driver terminal 200_i accepts the keep-approved call within a predetermined time from the keep approval request with respect to the corresponding call (S24).

When the driver accepts the keep-approved call through the driver terminal 200_i within the predetermined time, the control server 100 receives the call acceptance and approves dispatch for the accepted call (S25).

In step S21, when the control server 100 receives the call acceptance for the corresponding call from the driver terminal 200_i, it approves the dispatch for the accepted call (S25).

In other words, when the control server 100 receives the call acceptance from the driver terminal 200_i, and when the call acceptance is not keep-approved for the remaining driver terminals, dispatch of the vehicle corresponding to the driver terminal 200_i may be approved. In addition, when the control server 100 receives the call acceptance from the driver terminal 200_i within the predetermined time from the time the control server 100 receives the call request signal, and when the corresponding call is the keep-approved call for the driver terminal 200_i, dispatch of the vehicle corresponding to the driver terminal 200_i may be approved.

When the driver does not accept the keep-approved call within the predetermined time through the driver terminal 200_i, the control server 100 releases the keep of the call (S26). The predetermined time may be preset as initial information by the control server 100. For example, the predetermined time may be set to 3 minutes.

In addition, after the call keep of the driver terminal 200_i is approved, when a call keep approval request for another call request or a call acceptance for another call request is received from the driver terminal 200_i, the control server 100 may immediately release the call keep for the corresponding call. In addition, after the call keep of the driver terminal 200_i is approved, when receiving the call keep release signal from the driver terminal 200_i, the control server 100 may immediately release the call keep for the corresponding call.

In addition, after the call keep for the corresponding call of the driver terminal 200_i is approved (S23), until the corresponding call keep is released (S26), the remaining driver terminals may not transmit the call accept for the corresponding call, or may request the call keep approval. Alternatively, after the corresponding call keep of the driver terminal 200_i is approved (S23), until the corresponding call keep is released (S26), when the control server 100 receives a call keep approval request or call acceptance for the corresponding call from the remaining driver terminals, it may immediately reject the call keep approval request or call acceptance. Alternatively, after the call keep for the corresponding call of the driver terminal 200_i is approved (S23), until the corresponding call keep is released (S26), the control server 100 does not transmit the call information for the corresponding call to the remaining driver terminals.

In step S22, when the call keep situation information does not meet the approval requirement, the control server 100 rejects the call keep approval (S27). When the control server 100 rejects the call keep approval, the control server 100 may transmit the keep approval rejection information to the driver terminal 200_i.

The driver terminal 200_i that has received the keep approval rejection information may output the keep approval rejection information through the output part. Referring to FIG. 5C, upon receiving the keep approval rejection information from the control server 100, the driver terminal 200_i may display the keep approval rejection information on the touch screen of the driver terminal 200_i.

FIG. 6 illustrates a detailed flowchart of a call dispatch method according to an embodiment in which a step of determining whether call keep situation information of FIG. 4 satisfies an authorization requirement is implemented. FIG. 6 illustrates step S22 of FIG. 4 embodied as steps S221 to 226. In FIG. 6, a repeated description of FIG. 4 among steps S21 to S26 will be omitted.

When a call keep approval request for a corresponding call is received from the driver terminal 200_i in step S21, the control server 100 determines whether there are other keep-approved calls for the driver terminal 200_i (S221). The call keep approval request may include information on keep approval details. The control server 100 determines whether there are keep-approved calls for other calls by the driver terminal 200_i based on the call keep approval request signal. Here, the keep-approved calls exclude a call for which the keep-approved call is released after the keep is approved for other calls.

When there is no other keep-approved call for the driver terminal 200_i, the control server 100 determines whether the number of call keeps approved for other call requests having a departure point within a predetermined distance based on the departure point of the corresponding call request is a predetermined number or more (S222). The control server 100 counts the number of call keeps approved for other call requests of which departure point is within a predetermined distance based on the departure point of the corresponding call request among other keep-approved calls, and determines whether the counted number is the predetermined number or more. Here, the predetermined distance and the predetermined number may be preset in the control server 100 as initial information. For example, the control server 100 may determine whether there are 10 or more keep-approved calls within a radius of 1 km based on the departure point of the call request.

When the number of call keeps approved for another call request in which a location within a predetermined distance based on the departure point of the corresponding call request is set to a departure point is less than a predetermined number, the control server 100 may approve the call keep (S23).

In step S221, when there are other keep-approved calls for the driver terminal 200_i, it may determine whether the number of the accumulated call keeps is the predetermined number or more (S223).

The control server 100 may derive the number of the accumulated call keeps through the driver terminal 200_i based on the call keep approval request. The number of the accumulated call keeps may be the number of the released call keeps after the call keep approval in the driver terminal 200_i. Here, the predetermined number may be preset as initial information by the control server 100. For example, the control server 100 may determine whether the number of the accumulated call keeps of the driver terminal 200_i is three or more.

When the number of the accumulated call keeps is the predetermined number or more, the control server 100 may reject the call keep approval (S224).

The control server 100 may reject the call keep approval, and may stop using the call keep by the driver terminal 200_i that has transmitted the call keep approval request signal (S225). Here, when the call keep use of the driver terminal 200_i is stopped, the driver terminal 200_i may not transmit a call keep approval request to the control server 100. Alternatively, the control server 100 may immediately reject the call keep approval request of the driver terminal 200_i in which the call keep use is stopped. An effect of the call keep use stop may last for a predetermined time. Here, the predetermined time may be preset as initial information by the control server 100. For example, the control server 100 may stop the call keep use of the driver terminal 200_i for 1 hour. Here, the driver terminal 200_i of which call keep use is stopped may accept the corresponding call requested from the control server 100, or may accept another call.

In step S223, when the accumulated number of call keeps is less than the predetermined number, the control server 100 may release the keep of another call approved by the driver terminal 200_i (S226). The control server 100 may release the keep of another call for which the keep is approved, and may proceed with the call dispatch method related to the corresponding call from step S222.

Figure 7:
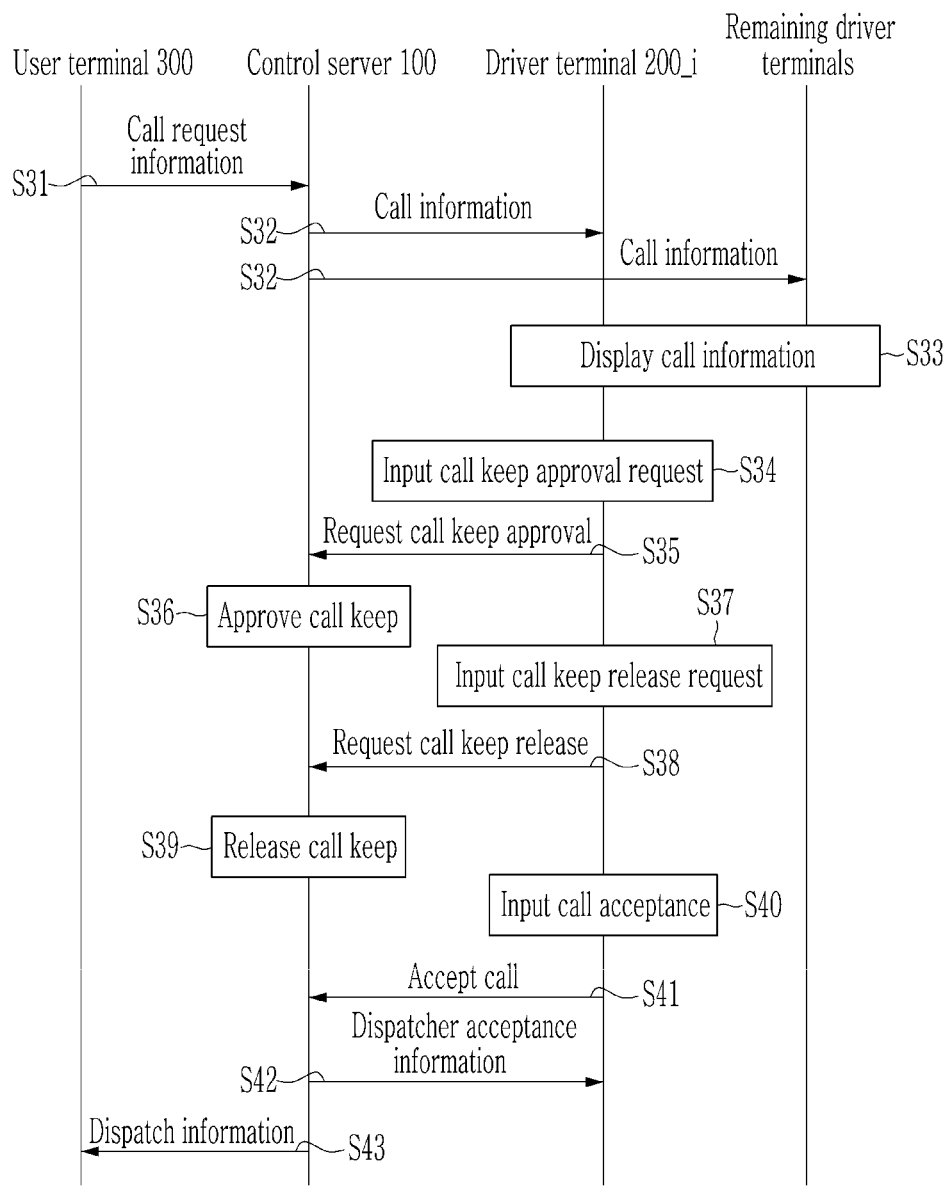
FIG. 7 illustrates a flowchart of a call dispatch method according to an embodiment.

FIG. 7 illustrates a flowchart of a call dispatch method according to an embodiment.

Referring to FIG. 7, in the call dispatch method according to the embodiment, the user terminal 300 transmits call request information to the control server 100 (S31) to request a call.

The control server 100 that has received the call request information transmits the call information to the driver terminal 200 (S32). Here, the driver terminal 200 includes the driver terminal 200_i and the remaining driver terminals.

The driver terminal 200 that has received the call information may display the call information through the output part (S33).

The driver terminal 200_i may request call keep approval for the corresponding call. When the call keep approval request is inputted through the input part of the driver terminal 200_i (S34), the driver terminal 200_i may transmit the call keep approval request to the control server 100 (S35).

The control server 100 may determine whether the call keep situation information satisfies the approval requirement for the call keep approval request of the driver terminal 200_i, and may approve the call keep when the approval requirement is satisfied (S36). When the call keep is approved, the control server 100 may not expose the corresponding call to the remaining driver terminals. The control server 100 may not transmit the corresponding call information to the remaining driver terminals. Alternatively, when the control server 100 receives the keep approval request of the corresponding keep approved call or the call acceptance of the corresponding call from the remaining driver terminals, the control server 100 may immediately reject the keep approval request of the call or the acceptance of the call.

The driver terminal 200_i that kept the corresponding call may receive a call keep release request for the corresponding call through the input part (S37). When the call keep release request is inputted through the input part of the driver terminal 200_i, the driver terminal 200_i may transmit the call keep release request to the control server 100 (S38).

When receiving the call keep release request from the driver terminal 200_i, the control server 100 may release the call keep of the driver terminal 200_i (S39). In addition, even when there is no call keep approval request input, when the driver terminal 200_i does not accept the keep-approved call for a predetermined time after the corresponding call keep is approved, the control server 100 may release the call keep of the driver terminal 200_i (S39). Alternatively, when the driver terminal 200_i accepts another call after the corresponding call keep is approved or requests keep approval for another call, the control server 100 may release the corresponding call keep of the driver terminal 200_i (S39). When the call keep is released, the control server 100 may expose the call for which the call keep is released to the driver terminal 200_i and the remaining driver terminals. In addition, when the call keep is released, the control server 100 may transmit the call information for the corresponding call to the driver terminal 200_i and the remaining driver terminals. In addition, when the call keep is released, the remaining driver terminals may also transmit acceptance of the corresponding call to the control server 100.

When the corresponding call acceptance is inputted through the input part of the driver terminal 200_i (S40), the driver terminal 200_i may transmit the call acceptance to the control server 100 (S41).

The control server 100 that has received the call acceptance may transmit dispatch acceptance information to the driver terminal 200_i (S42). In addition, the control server 100 may transmit dispatch information to the user terminal 300 (S43). Here, the dispatch information may include a vehicle number of a taxi using a dispatched driver terminal 200_i, an estimated time of arrival at the departure point of the taxi, an estimated arrival time of the taxi from the departure point to a destination, and the like.

As described above, while experimental examples and examples of the present disclosure has been illustrated and described in connection with what is presently considered to be practical embodiments, it is to be understood that the scope of the present disclosure is not limited to the disclosed experimental examples and embodiments, but, on the contrary, is intended to cover various modifications and equivalent arrangements included without departing from the spirit and scope of the appended claims.

DESCRIPTION OF SYMBOLS

1: call dispatch system
100: control server
110: call transmitter
120: keep approval determiner
130: call dispatch approval part
200: driver terminal
210: application
300: user terminal
310: application

What is claimed is:

1. A call dispatch method, comprising:
receiving, by a control server, a call request signal including a departure point, a destination, and a call request time, a call request signal from a user terminal for dispatch of a vehicle;
calculating, by the control server, a call score for a call based on a number of call requests in which a location within an arrival range of the call is set to a departure point;
transmitting, by the control server, call information according to the call request signal to a plurality of driver terminals when the call score is a predetermined score or more;
receiving, by the control server, a call keep approval request for the call from one driver terminal of the plurality of driver terminals;
determining, by the control server, to approve the call keep approval request based on whether call keep situation information for the one driver terminal satisfies an approval requirement;
releasing, by the control server, when not receiving call acceptance of the call within a predetermined time from the one driver terminal, an approved call keep,
approving, by the control server, when receiving call acceptance of the call within the predetermined time from the one driver terminal, dispatch for the accepted call; and
transmitting, by the control server, the keep approval rejection information to the one driver terminal when rejecting the call keep approval,
wherein the calculating of the call score includes calculating, by the control server, the call score by adding at least two of the number of call requests in which a location that is within an arrival range of the call based on a specific time point depending on a time point at which the call request signal is received is set to a departure point, a daily average value of the call requests in which the location that is within the arrival range of the call is set to the departure point, and an average value of a day of a week of the call requests in which the location that is within the arrival range of the call is set to the departure point, and
wherein the approval requirement is determined based on whether there is another keep-approved call for one driver terminal, an accumulated number of cases in which call keep is approved and then released for the one driver terminal, and the number of call keeps approved for another call request in which a location within a predetermined distance based on a departure point of the call request is a departure point.

2. The call dispatch method of claim 1, wherein the determining of whether to approve the call keep includes:
determining, by the control server, when there is another keep-approved call for the one driver terminal and when the accumulated number of cases in which call keep is approved and then released for the one driver terminal is a predetermined number or more, that the call keep situation information does not satisfy the approval requirement.

3. The call dispatch method of claim 1, wherein the determining of whether to approve the call keep includes:
releasing, by the control server, when there is another keep-approved call for the one driver terminal and when the accumulated number of cases in which call keep is approved and then released for the one driver terminal is less than a predetermined number, the keep of another call for which the keep has been approved; and
determining, by the control server, when the number of call keeps approved for another call request having a departure point within a predetermined distance based on a departure point of the call is a predetermined number or more, that the call keep situation information does not satisfy the approval requirement.

4. The call dispatch method of claim 1, wherein the determining of whether to approve the call keep includes:
releasing, by the control server, when there is another keep-approved call for the one driver terminal of the plurality of driver terminals and when the accumulated number of cases in which call keep is approved and then released for the one driver terminal is less than a predetermined number, the keep of another call for which the keep has been approved; and
determining, by the control server, when the number of call keeps approved for another call request having a departure point within a predetermined distance based on a departure point of the call is less than a predetermined number, that the call keep situation information satisfies the approval requirement.

5. The call dispatch method of claim 1, wherein the determining of whether to approve the call keep includes:
determining, by the control server, when there is no other keep-approved call for the one driver terminal of the plurality of driver terminals and when the number of call keeps approved for another call request having a departure point within a predetermined distance based on a departure point of the call is a predetermined number or more, that the call keep situation information does not satisfy the approval requirement.

6. The call dispatch method of claim 1, wherein the determining of whether to approve the call keep includes:
determining, by the control server, when there is no other keep-approved call for the one driver terminal of the plurality of driver terminals and when the number of call keeps approved for another call request having a departure point within a predetermined distance based on a departure point of the call is less than a predetermined number, that the call keep situation information satisfies the approval requirement.

7. The call dispatch method of claim 1, further comprising:
rejecting, by the control server, approval of the call keep when the call keep situation information does not satisfy the approval requirement; and not approving, by the control server, when rejecting the approval of the call keep, the call keep approval request received from the one driver terminal for a predetermined time.

8. A control server comprising:
a call transmitter, when a call request signal including a departure point, a destination, and a call request time is received from a user terminal for dispatch of a vehicle, that calculates a call score for a call based on a number of call requests in which a location within an arrival range of the call is set to a departure point and transmits call information according to the call request signal to a plurality of driver terminals when the call score is a predetermined score or more;
a keep approval determiner, when a call keep approval request is received from one driver terminal of the plurality of driver terminals, that determines to approve the call keep or reject the call keep approval based on whether call keep situation information for the one driver terminal satisfies an approval requirement; and
a call dispatch approval part, when a call acceptance for a kept call is received within a predetermined time after the call keep approval is determined, that approves dispatch for the accepted call,
wherein the call dispatch approval part releases an approved call keep when not receiving call acceptance of the call within the predetermined time from the one driver terminal,
wherein the control server transmits the keep approval rejection information to the one driver terminal when rejecting the call keep approval,
wherein the call transmitter calculates a call score by adding at least two of a number of call requests in which a location that is within an arrival range of the call based on a specific time point depending on a time point at which the call request signal is received is set to a departure point, a daily average value of the call requests in which the location is set to the departure point, and an average value of a day of a week of the call requests in which the location is set to the departure point, and transmits, when the call score is a predetermined score or more, call information according to the call request signal to the driver terminal, and
wherein the approval requirement is determined based on whether there is another keep-approved call for one driver terminal, an accumulated number of cases in which call keep is approved and then released for the one driver terminal, and the number of call keeps approved for another call request in which a location within a predetermined distance based on a departure point of the call request is a departure point.

9. The control server of claim 8, wherein the keep approval determiner rejects the call keep approval when there is another keep-approved call for the one driver terminal and when the accumulated number of cases in which call keep is approved and then released for the one driver terminal is a predetermined number or more.

10. The control server of claim 8, wherein the keep approval determiner releases the keep of another call for which the keep has been approved when there is another keep-approved call for the one driver terminal and when the accumulated number of cases in which call keep is approved and then released for the one driver terminal is less than a predetermined number.

11. The control server of claim 10, wherein the keep approval determiner rejects the call keep approval when the number of call keeps approved for another call request having a departure point within a predetermined distance based on a departure point of a call for which the keep approval is requested is a predetermined number or more.

12. The control server of claim 10, wherein the keep approval determiner approves the call keep for which the approval is requested when the number of call keeps approved for another call request having a departure point within a predetermined distance based on a departure point of a call for which the keep approval is requested is less than a predetermined number.

13. The control server of claim 8, wherein the keep approval determiner rejects the call keep approval when there is no other keep-approved call for the one driver terminal and when the number of call keeps approved for another call request having a departure point within a predetermined distance based on a departure point of a call for which the keep approval is requested is a predetermined number or more.

14. The control server of claim 8, wherein the keep approval determiner approves the call keep for which the approval is requested when there is no other keep-approved call for the one driver terminal and when the number of call keeps approved for another call request having a departure point within a predetermined distance based on a departure point of the call is less than a predetermined number.

* * * * *